(12) United States Patent
Crisan

(10) Patent No.: US 6,292,890 B1
(45) Date of Patent: Sep. 18, 2001

(54) COMPUTER SYSTEM WITH DYNAMICALLY CONFIGURABLE BOOT ORDER

(75) Inventor: Adrian Crisan, Cypress, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/162,907

(22) Filed: Sep. 29, 1998

(51) Int. Cl.$^7$ .................................................. G06F 9/445
(52) U.S. Cl. .............................. 713/2; 710/104; 709/220
(58) Field of Search .................................. 713/1, 2, 100; 709/220, 221, 222, 200; 710/104; 712/1

(56) References Cited

U.S. PATENT DOCUMENTS

| | | | |
|---|---|---|---|
| 5,379,342 | * 1/1995 | Arnold et al. | 380/2 |
| 5,506,999 | * 4/1996 | Skillman et al. | 712/1 |
| 5,577,210 | * 11/1996 | Abdous et al. | 709/200 |
| 5,692,197 | * 11/1997 | Narad et al. | 713/300 |
| 5,751,950 | 5/1998 | Crisan | 395/188.01 |
| 5,822,582 | * 10/1998 | Doragh et al. | 713/2 |
| 5,835,719 | * 11/1998 | Gibson et al. | 709/221 |
| 5,854,905 | * 12/1998 | Garney | 710/104 |
| 5,860,001 | * 1/1999 | Cromer et al. | 713/1 |
| 5,870,554 | * 2/1999 | Grossman et al. | 709/222 |
| 5,892,902 | * 4/1999 | Clark | 713/201 |
| 5,892,943 | * 4/1999 | Rockford et al. | 713/2 |
| 5,898,869 | * 4/1999 | Anderson | 713/2 |
| 5,938,771 | * 8/1999 | Williams | 713/310 |
| 5,948,101 | * 9/1999 | David et al. | 713/2 |
| 5,960,168 | * 9/1999 | Shaw et al. | 358/1.15 |

FOREIGN PATENT DOCUMENTS

07056818 * 3/1995 (JP).

OTHER PUBLICATIONS

IBM Technical Disclosure Bulletin, Title "Operating System and Machine independent Hibernation", pp 143–144, May 1995.*

AMD—Magic Packet Technology, Magic Packet™ Technology, Last Updated Jun. 30, 1998, ©1998 Advanced Micro Devices, Inc.

Microsoft, Simple Boot Flag Specification, Version 1.0.

AMD, Magic Packet Technology Application in Hardware and Software.

* cited by examiner

Primary Examiner—Thomas Lee
Assistant Examiner—RiJue Mai
(74) Attorney, Agent, or Firm—Conley, Rose & Tayon, P.C.; Michael F. Heim; Daniel J. Krueger

(57) ABSTRACT

A computer system is provided with a dynamically reconfigurable boot order. In one embodiment, the computer comprises a network interface, a nonvolatile memory, and a CPU. The network interface may be coupled to a network to receive a "wake-up" data packet, that is, a data packet that includes a predetermined data pattern for which the network interface can be configured to scan. Upon detecting the wake-up data packet, the network interface can initiate a computer boot-up sequence. The CPU begins a boot-up sequence by retrieving a BIOS from the nonvolatile memory. One portion of the boot-up sequence specified by the BIOS includes determining and accessing a series of target boot devices to locate and retrieve an operating system. Preferably, the order of the series of target boot devices (i.e. the "boot order") is different from a default boot order if the network interface initiated the current boot-up sequence. Otherwise, the default boot order is used. The difference in the boot orders may be that the default boot order begins with local boot devices and the boot order resulting from a remote boot begins with network boot devices.

25 Claims, 3 Drawing Sheets

COMPUTER SYSTEM WITH DYNAMICALLY CONFIGURABLE BOOT ORDER

BACKGROUND OF THE INVENTION

1. Field of the Invention

The present invention relates generally to a system and method for altering the order in which boot devices are tried during system initialization. More particularly, the present invention relates to a computer system having a boot order that can be adjusted during the initialization of the system if the system is being initialized remotely.

2. Background of the Invention

Due to the advent of power management technology and the more recent "instant-on" efforts, there are many ways in which a computer may exist in the "OFF" state. Examples include hard off (power is disconnected), soft off (power is supplied only to components which monitor activity external to the system), suspend mode (contents of memory are stored on disk and current state of computer is preserved while power consumption is reduced to a minimum level), and sleep mode (the clock signal is reduced or halted to some or all of the system components during periods of inactivity). The sleep and suspend modes may each be invoked at various levels, depending on the particular implementation of these modes, and recovery from these modes is implementation specific.

Turning a computer "ON" from the hard-off or the soft-off state causes the computer to begin an initialization process. In the initialization process, a system reset signal is asserted and released. After the de-assertion of the reset signal, many of the system peripheral components initialize themselves, retrieve configuration information from dedicated EEPROMs, and enter an initialized state. At the same time, the CPU resets itself and searches for instructions on how to prepare the system for operation. The initial instructions are known as the BIOS (basic input/output system) and are typically found by the CPU in a nonvolatile memory such as a ROM (read-only memory). The BIOS is built-in software that contains all the code required to control the keyboard, display screen, disk drives, serial communications, and a number of miscellaneous functions. The BIOS also specifies a boot-up sequence for the CPU to execute to make the computer ready for operation.

Typically, the first thing that the BIOS instructs the CPU to do is to perform what is called the Power-On Self-Test, or POST for short. The POST is a built-in diagnostic program that checks the computer's hardware to ensure that everything is present and functioning properly, before the BIOS begins the actual boot process. Some additional tests are performed later in the boot process. If any fatal errors are encountered, the boot process stops. After the initial POST, the BIOS instructs the CPU to locate the video system's built in BIOS program and to execute it to initialize the video system. The CPU then displays the BIOS's startup screen, and searches for other devices to see if any of them have initialization routines. If any other device initialization routines (e.g. IDE hard drive) are found, they are executed as well. The CPU does more tests on the system, including the memory count-up test which may be viewed on the video display. If an error is encountered at this point, a text error message will generally be displayed on the video display. The BIOS boot-up sequence includes a "system inventory" of sorts, performing more tests to determine what sort of hardware is in the system. Modern BIOSes have many automatic settings and will determine memory timing (for example) based on what kind of memory it finds. Many BIOSes can also dynamically set hard drive parameters and access modes, and will determine these at roughly this time. The BIOS will also now instruct the CPU to search for and label logical devices (COM and LPT ports). If the BIOS supports the Plug and Play standard, the CPU will detect and configure Plug and Play devices at this time and display a message on the screen for each one it finds. The CPU will often display a summary screen about the system configuration and begin a search for a boot device.

Some modern BIOSes contain a boot table that specifies the order of devices from which the system should try to boot. If the first device in the list is present and available, the BIOS will boot the system from that device. If that device is not available, the BIOS will attempt to access the second device in the boot table, and if successful, will boot the system from that device. If the target device that the system tries is not found, the CPU will then try the next device in the boot table, and continue until it finds a bootable device. If no boot device at all can be found, the system will normally display an error message and then freeze up the system.

After having identified a target boot drive, the BIOS instructs the CPU to look for boot information to start the operating system boot process. For example, with a hard disk, the CPU may search for a master boot record at cylinder 0, head 0, sector 1 (the first sector on the disk). If the CPU finds the master boot record, the CPU starts the process of booting the operating system, using the information in the boot sector. At this point, the code in the boot sector takes over from the BIOS code.

The boot devices which may be accessed during the above boot-up sequence include any nonvolatile storage device. Floppy disks, hard disks, magnetic tape, CD-ROMs, Flash ROMs, and network server disks are all examples of devices which can serve as a boot device. To be a boot device, a device should hold a copy of an operating system or application which is to be executed after system initialization. Often the boot device includes a "boot-sector" that informs the CPU of the operating system's exact storage location. Local devices (i.e. devices included in the computer or directly connected to the computer) may in some systems be preferred over remote devices (i.e. devices that need to be accessed via a network or shared communications link) for booting a computer system, while in other systems remote devices may be preferred.

Many variations exist for the boot-up sequence conducted by the BIOS. As computer hardware has become increasingly reliable, proposals have been made to eliminate POST tests altogether from the normal boot-up sequence. For example, in "Simple Boot Flag Specification: Version 1.0", Microsoft has proposed the use of a register to communicate boot options to the system BIOS. The boot flags are PNPOS, BOOTING, and DIAG. The PNPOS flag is asserted if the operating system normally used by the computer is Plug-and-Play capable. If this is the case, the BIOS does not need to spend time configuring components that the operating system will configure. The DIAG flag is de-asserted if hardware tests are considered unnecessary. In this case, the BIOS can skip the POST. The BOOTING flag, if asserted, indicates that the previous boot attempt did not successfully complete and the BIOS may choose to ignore the other flags and provide a complete system test and configuration sequence.

When a computer is in a soft-off state, suspend, or sleep state, it may be configured to awaken if activity is detected, e.g. movement of a mouse or detection of a "wake up" data packet by a network interface card. The source of the triggering activity may come from a local mechanism (i.e. a switch or sensor of any kind such as a power switch, a reset switch, a pressable key, a pressure sensor, a mouse, a joystick, a touch pad, a microphone, or a motion sensor), or the trigger source may be remote. The ability to remotely awaken (from sleep and suspend states) or boot up (from the soft-off state) a computer increases its usability and maintainability. For example, a user can remotely retrieve files even when the computer was turned off, and a system administrator can perform system maintenance without needing to physically visit each computer.

Under certain circumstances, it would be desirable to be able to dynamically reconfigure the order in which devices are targeted for booting the computer. A computer that initially tries to boot from a floppy disk is unable to boot if a non-bootable floppy disk is present in the drive. This would prevent anyone attempting to boot the machine remotely from successfully doing so. In another instance, a system administrator wishing to install a new operating system might prefer to bypass the local drives and boot directly from a network drive. Currently, no systems are known to exist that provide the ability to dynamically reconfigure the boot order when a computer is remotely turned on.

SUMMARY OF THE INVENTION

Accordingly, there is provided herein a computer system having a dynamically reconfigurable boot order. In one embodiment, the computer comprises a network interface, a nonvolatile memory, and a CPU. The network interface may be coupled to a network to receive a "wake-up" data packet, that is, a data packet that includes a predetermined data pattern for which the network interface can be configured to scan. Upon detecting the wake-up data packet, the network interface can initiate a computer boot-up sequence. The CPU begins a boot-up sequence by retrieving a BIOS from the nonvolatile memory. One portion of the boot-up sequence specified by the BIOS includes determining and accessing a series of target boot devices to locate and retrieve an operating system. Preferably, the order of the series of target boot devices (i.e. the "boot order") is different from a default boot order if the network interface initiated the current boot-up sequence. Otherwise, the default boot order is used. The difference in the boot orders may be that the default boot order begins with local boot devices and the boot order resulting from a remote boot begins with network boot devices.

In another embodiment, the computer system may configure one or more local input devices to trigger a boot-up sequence in which the boot order is dynamically altered from the default sequence. One contemplated implementation provides a biometrics device (such as a fingerprint reader or a retinal scanner) that triggers a boot-up from a network if activated while the computer is in the soft-off state.

BRIEF DESCRIPTION OF THE DRAWINGS

A better understanding of the present invention can be obtained when the following detailed description of the preferred embodiment is considered in conjunction with the following drawings, in which.

Figure 1:
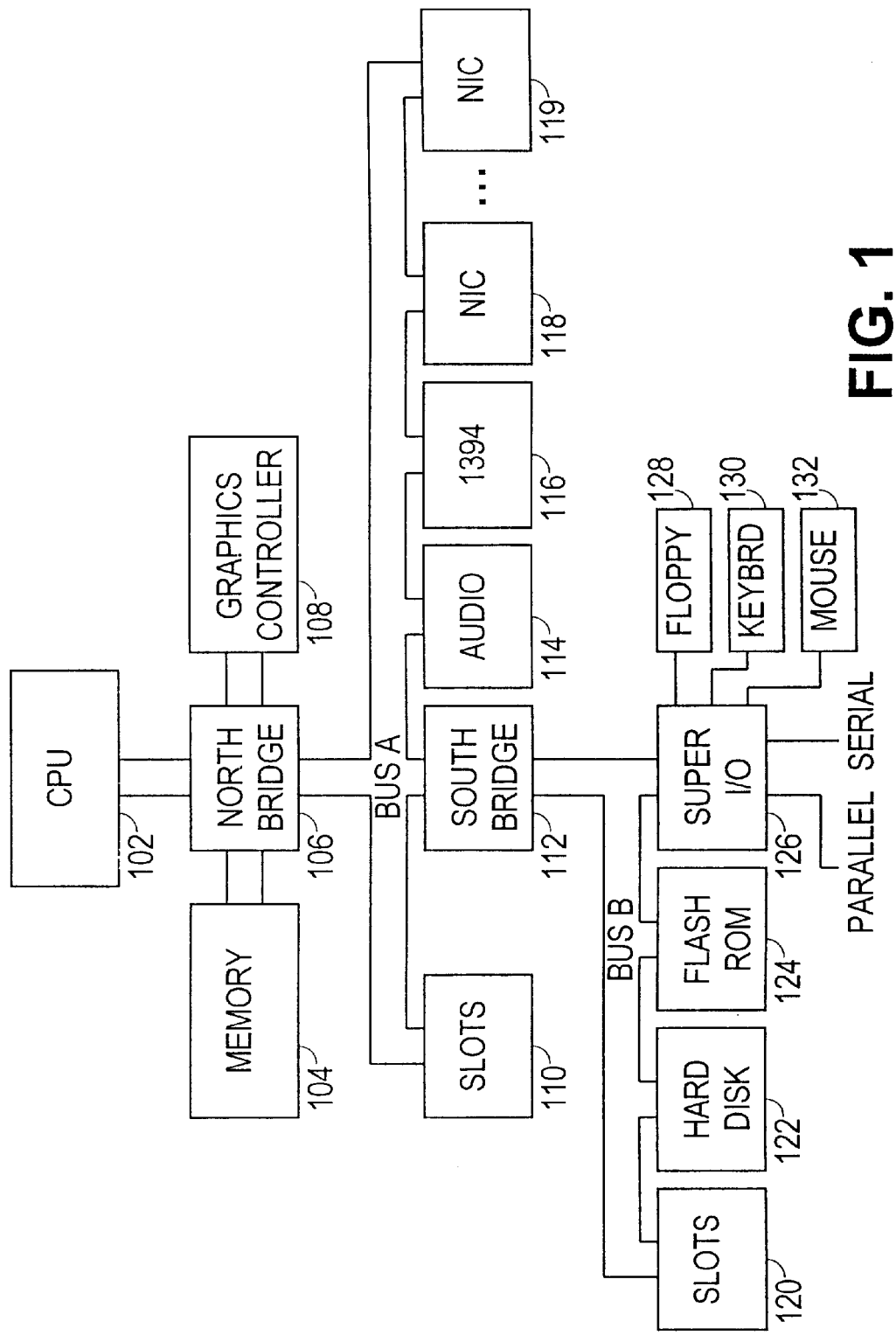
FIG. 1 is a block diagram of a computer system illustrating various system components.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

In addition, certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection or through an indirect electrical connection via other devices and connections.

DETAILED DESCRIPTION OF PREFERRED EMBODIMENTS

Turning now to the figures, FIG. 1 illustrates an example of a configuration of various computer components that may be found in a representative computer system. It is noted that many other representative configurations exist and that this embodiment is described for illustrative purposes. The computer system of FIG. 1 includes a CPU 102 coupled to a bridge logic device 106 via a CPU bus. The bridge logic device 106 is sometimes referred to as a "North bridge" for no other reason than it often is depicted at the upper end of a computer system drawing. The North bridge 106 also couples to a main memory array 104 by a memory bus, and may further couple to a graphics controller 108 via an advanced graphics processor (AGP) bus. The North bridge 106 couples CPU 102, memory 104, and graphics controller 108 to the other peripheral devices in the system through a primary expansion bus (BUS A) such as a PCI bus or an EISA bus. Various components that understand the bus protocol of BUS A may reside on this bus, such as an audio device 114, a IEEE 1394 interface device 116, and a network interface card (NIC) 118. The system may include more than one network interface, as indicated by NIC 119. These components may be integrated onto the motherboard, as suggested by FIG. 1, or they may be plugged into expansion slots 110 that are connected to BUS A.

If other secondary expansion buses are provided in the computer system, as is typically the case, another bridge logic device 112 is used to couple the primary expansion bus (BUS A) to the secondary expansion bus (BUS B). This bridge logic 112 is sometimes referred to as a "South bridge" reflecting its location vis-a-vis the North bridge 106 in a typical computer system drawing. An example of such bridge logic is described in U.S. Pat. No. 5,634,073, assigned to Compaq Computer Corporation. Various components that understand the bus protocol of BUS B may reside on this bus, such as hard disk controller 122, Flash ROM 124, and Super I/O controller 126. Slots 120 may also be provided for plug-in components that comply with the protocol of BUS B.

The Super I/O controller 126 typically interfaces to basic input/output devices such as a keyboard 130, a mouse 132, a floppy disk drive 128, a parallel port, a serial port, and sometimes various other input switches such as a power switch and a suspend switch. The Super I/O controller 126 often has the capability to handle power management functions such as reducing or terminating power to components such as the floppy drive 130, and blocking the clock signals that drive components such as the bridge devices 106, 112 thereby inducing a sleep mode in the expansion buses. The Super I/O controller 126 may further assert System Management Interrupt (SMI) signals to various devices such as the CPU 102 and North bridge 106 to indicate special conditions pertaining to input/output activities such as sleep mode. The Super I/O controller 126 may incorporate a counter or a Real Time Clock (RTC) to track the activities of certain components such as the hard disk 122 and the primary expansion bus, inducing a sleep mode or reduced power mode after a predetermined time of inactivity. The Super I/O controller 126 may also induce a low-power suspend mode if the suspend switch is pressed, in which the power is completely shut off to all but a few selected devices. Exempted devices might be the Super I/O controller 126 itself and NIC 118.

When a computer is in a soft-off state, suspend, or sleep state, the Super I/O controller 126 may be configured to rouse the computer if activity is detected, e.g. movement of the mouse 132 or detection of a "wake up" data packet by NIC 118. One suitable implementation of a wake-up packet is described in "Magic Packet Technology Application in Hardware and Software" published in March 1996 by Advanced Micro Devices and hereby incorporated by reference. The source of the triggering activity may alternatively come from a local mechanism (i.e. a switch or sensor of any kind such as a power switch, a reset switch, a pressable key, a pressure sensor, a mouse, a joystick, a touch pad, a microphone, a motion sensor, or a biometric device (e.g. fingerprint reader)), or the trigger source may be remote and perhaps communicated to the computer system by a network, serial bus, modem, or some other communications link.

Referring still to FIG. 1, the BIOS stored in Flash ROM 124 includes a boot table which specifies a default boot order. The default boot order is the order in which the boot devices are normally accessed in the effort to locate and execute an operating system. For example, a popular boot order is:

CD-ROM
FLOPPY DRIVE
HARD DISK #1
SCSI
NETWORK DRIVE #1
NETWORK DRIVE #2

This order is popular because it allows the computer to operate from a local drive (e.g. the CD-ROM, floppy drive, or hard disk) whenever possible, thereby maximizing system performance. However, computers which for some reason may have missing or corrupted operating systems can still boot up using another copy of an operating system that may be stored elsewhere (e.g. the master copy of the operating system stored on a network server).

This may not be the only time that the user wishes to boot from an operating system on one of the additional boot-up devices (e.g. a SCSI device or one of the network drives). In one computer system, the option may be provided to bypass the local boot-up devices if the user presses and holds a function key during the boot-up sequence. In another computer system, the user may manually reconfigure the default boot order in the configuration program provided by most modern BIOSes so that the desired boot device appears first. However, both of these options require a user to be present at the keyboard to alter the boot order during the initialization of the computer.

Figure 2:
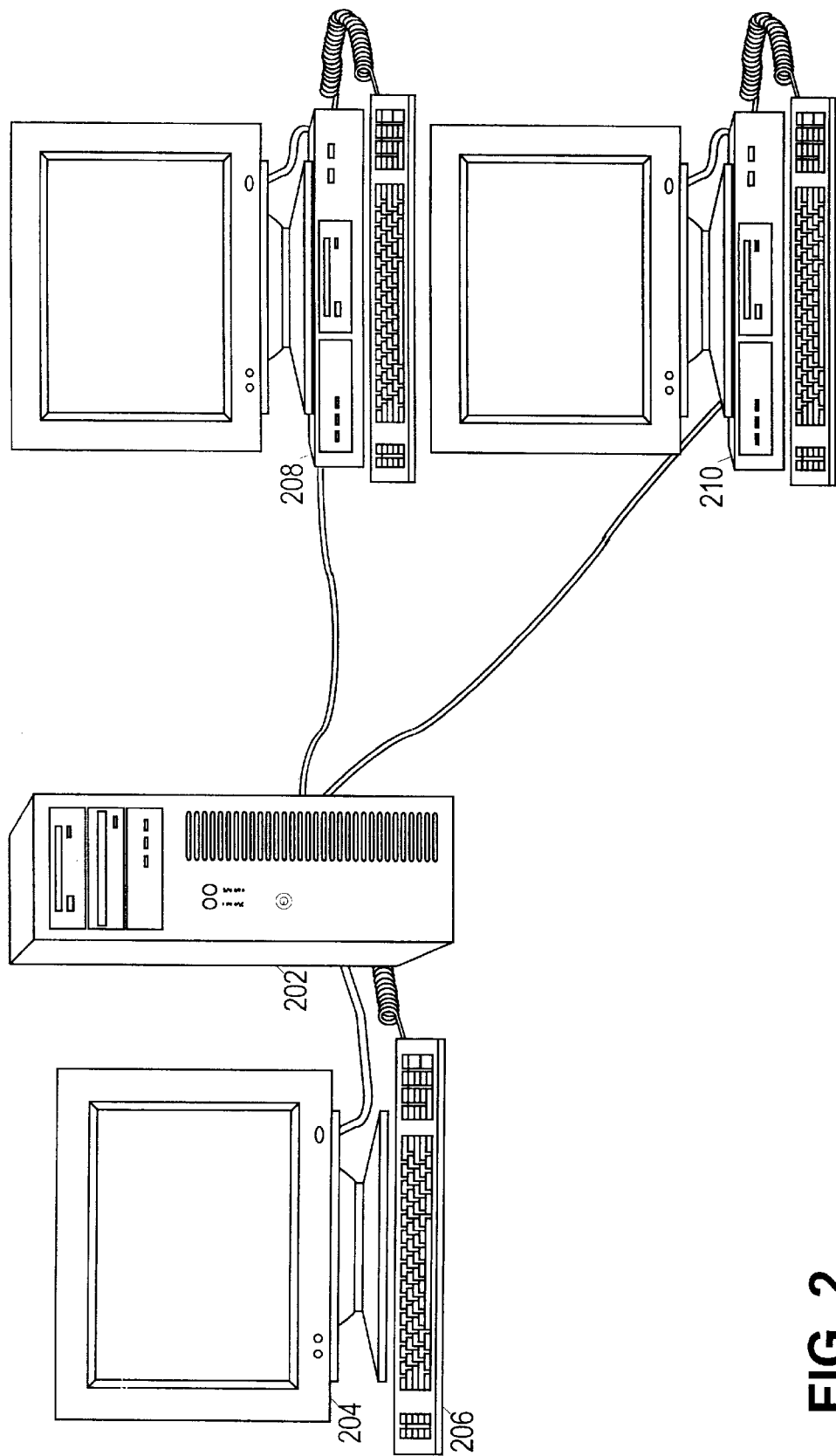
FIG. 2 is an illustrative diagram of a simple computer network.

FIG. 2 shows an example of a computer network in which a central server 202 is coupled to a first computer 208 and a second computer 210. A system administrator operating at a terminal 204 with input device 206 can cause transmission of a network data packet to first and second computers 208, 210 to instruct either of the computers 208, 210 to boot up. Advanced Micro Devices (AMD) has proposed a "Magic Packet™ Technology" that supports this ability. In essence network interface cards in computers 208, 210, after being placed in a remote boot mode, continually scan incoming data packets for a predetermined sequence even when the computers are powered down. Upon detection of the predetermined sequence, the network interface card initiates a boot-up sequence. In one embodiment, the network interface card alerts a power management unit (which may be included in a Super I/O controller 126) to power up the computer.

It can be appreciated that the system administrator might desire to perform system maintenance of each of the computers in the network without leaving a central location. It may be further appreciated that the system administrator might wish to boot each of the computers from a master copy of the operating system as part of the system maintenance. Examples of when this could be desirable include: virus scanning, and executing automated maintenance software. In many operating systems, the system administrator can remotely instruct a computer to place the network card in a remote boot mode and to then power itself down.

Figure 3:
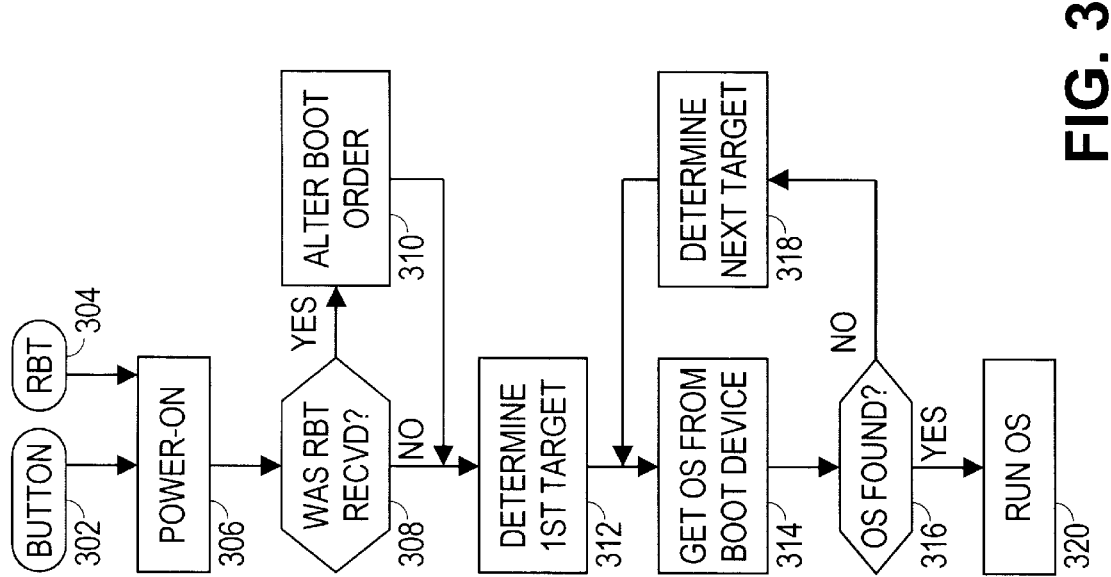
FIG. 3 illustrates a method for dynamically altering a computer's boot order.

FIG. 3 shows an illustrative flowchart which may be implemented by a computer's BIOS to provide dynamic configuration of the boot order. The flowchart includes a button press 302, a wake-up packet detection 304, a power-on step 306, a remote-boot trigger (RBT) test 308, a boot order reconfiguration step 310, a determine first target step 312, an Operating System load step 314, a load success test 316, a determine next step 318, and an execute Operating System step 320. In the flowchart of FIG. 3, the power-on step 306 can have multiple triggers, including a press of the power button 302 and detection of a wake-up packet 304. In the power-on step 306, power is provided to the computer's various system components including the CPU 102. The CPU 102 retrieves the BIOS from Flash ROM 124 and begins the boot-up sequence. During the boot-up sequence, the CPU 102 preferably checks for a remote-boot trigger (such as the detection of a wake-up packet flag 304) in step 308. The wake-up packet flag is asserted if a wake-up packet was detected. The wake-up packet flag may be implemented in various ways, e.g. the NIC 118 may assert and hold an interrupt signal to the CPU 102, or a power management unit may include a register having flags to indicate which device triggered the boot-up sequence. In an alternate embodiment, the wake-up packet may include a pattern which the CPU processes to verify that the wake-up packet is valid, e.g. an encrypted public key. In this instance, step 308 includes pattern processing to determine if a valid wake-up packet was received. Preferably, step 310 only gets performed if the wake-up packet is valid.

If the CPU 102 determines that the computer is being booted in response to a remote-boot trigger (i.e. a wake-up packet), the CPU 102 alters the boot order in step 310. In a first embodiment, the CPU 102 temporarily re-orders the entries in the boot table so that the network boot devices are accessed first and the local drives are only accessed if the computer fails to boot from the network. The original table stored in Flash ROM 124, however, is not altered so that subsequent computer boot-ups will follow the original boot order. In a second embodiment, the CPU 102 bypasses the local drives. In a third embodiment, the CPU 102 examines the wake-up packet to find a boot order there and uses the provided boot order in place of the default boot order provided by the boot table.

Using the original boot order, or the new boot order if a remote-boot trigger was detected, the CPU 102 determines a first target boot device in step 312 and attempts to retrieve an operating system from the target boot device in step 314. In step 316, the CPU 102 determines if the retrieval attempt was successful. If so, then in step 320, the BIOS turns control over to the retrieved operating system. If not, then in step 318, the CPU 102 determines a next target boot device, and loops back to step 314. The loop is repeated until an operating system is located or all boot devices have been unsuccessfully tried. If all boot devices have been unsuccessfully tried, the computer declares a fatal error and ceases all attempts to boot up.

At any time after a computer has booted up, such as during the power-down sequence, the wake-up packet flag may be reset, if desired. This prevents the continued alteration of the default boot-up sequence.

It may be appreciated that a computer network which consists of computers that support the above described features can be easily coordinated from a central location. In addition to simplifying the maintenance aspects of the computer network, the described features make it relatively straightforward to coordinate the individual machines to operate as a loosely coupled, parallel computing system during periods of relative inactivity.

The remote-boot trigger is not necessarily limited to remote triggers. In one embodiment, the remote-boot trigger may be a local trigger which causes the computer to try booting from the network before trying to boot from local boot devices. For example, use of a biometrics device (i.e. pressing a finger against a fingerprint scanner, or placing an eye proximate to a retinal scanner) could cause a computer to boot to a secure network server, validate the identity of an individual, and automatically log into a corresponding individual account. A suitable biometrics device is described in a co-pending U.S. patent application Ser. No. 09/149,400 filed Sep. 8, 1998 by inventors Manuel Novoa and Adrian Crisan. This is only one of many exemplary applications for a computer system having a dynamically reconfigurable boot order.

Hence, a method for dynamically reconfiguring a boot order has been disclosed which may advantageously provide desirable system features. Numerous variations and modifications will become apparent to those skilled in the art once the above disclosure is fully appreciated. For example, other temporary boot orders are contemplated, including simply adding a network drive as a first entry before the existing boot table, and implementing a flag to indicate that the network drive has already been attempted to prevent a second attempt if the network drive appears again later in the boot table. Also, more than one network interface may be present in the system, in which case the BIOS may be configured to test each network interface for the reception of a wake-up data packet. It is intended that the following claims be interpreted to embrace all such variations and modifications.

What is claimed is:

1. A computer having a dynamically reconfigurable boot order, wherein the computer comprises:

a network interface configurable to receive a data packet that includes a predetermined data pattern, wherein the network interface is configurable to responsively initiate a computer boot-up sequence;

a nonvolatile memory that stores a BIOS; and a CPU coupled to the network interface and the nonvolatile memory, and configured to retrieve the BIOS from the nonvolatile memory as part of the boot-up sequence, wherein the CPU is further configured to execute the BIOS to determine a first target boot-up device, wherein the CPU determines that the first target boot-up device is a network device if the network interface received the data packet, and wherein the CPU determines that the first target boot-up device is a local device otherwise.

2. The computer of claim 1, wherein the CPU is coupled to the network device by a second network interface.

3. The computer of claim 1, wherein the network interface is coupled to a network that includes said network device.

4. The computer of claim 1, wherein the local device is configurable to provide a first operating system and the network device is configurable to provide a second operating system to the CPU for execution.

5. The computer of claim 1, wherein the BIOS specifies a first boot order, and wherein the CPU determines a second boot order if the network interface received the data packet.

6. The computer of claim 5, wherein the second boot order is a simple re-ordering of the first boot order such that the second boot order begins with a network device present in the first boot order.

7. The computer of claim 5, wherein the second boot order is a truncated version of the first boot order such that the local devices are absent from the second boot order.

8. The computer of claim 5, wherein the second boot order is specified by the data packet.

9. The computer of claim 1, wherein the local device is one of a group of local devices including a floppy disk drive, a CD-ROM, and a hard disk drive.

10. The computer of claim 1, wherein the network device is a network disk drive.

11. The computer of claim 1, wherein the data packet is a "wake-up" packet and the network interface controller includes a register with a flag that is set whenever a "wake-up" packet is received.

12. The computer of claim 1, further comprising a power management unit configured to control distribution of power to various computer system components, wherein the power management unit is coupled to receive a packet detection signal from the network interface controller when the network interface controller receives said data packet, and wherein the power management unit is configured to responsively provide power to the various system components.

13. A method for booting up a computer, wherein the method comprises:

detecting a trigger event;

applying power to a CPU;

retrieving a BIOS that specifies a first boot order;

determining if the trigger event was reception of a wake-up packet; and creating a second boot order different from the first boot order if the trigger event was reception of a wake-up packet.

14. The method of claim 13, further comprising:
if the trigger event was not reception of a wake-up packet:
selecting a first target boot device from the first boot order; otherwise,
if the trigger event was reception of a wake-up packet:
selecting a first target boot device from the second boot order; and
accessing the first target boot device to retrieve an operating system.

15. The method of claim 14, further comprising:
determining if the operation system has been found;
selecting a next target boot device if the operating system has not been found; and
executing the operating system if the operating system has been found.

16. A computer network which comprises:
a network device for storing a first operating system;
a first computer configurable to transmit a wake-up data packet;
a second computer coupled to receive the wake-up data packet from the first computer, and coupled to the network device for retrieving the first operating system, wherein the second computer is configured to retrieve the first operating system from the network device in response to receiving the wake-up data packet, and wherein the second computer is configured to retrieve a second operating system from a local device if the second computer is booted up without having received a wake-up data packet.

17. The computer network of claim 16, wherein the second computer includes:
a network interface coupled to the first computer via a communications link and configured to initiate a boot-up sequence in response to receiving the wake-up data packet;
a nonvolatile memory that stores a BIOS; and
a CPU coupled to the network interface and the nonvolatile memory, and configured to retrieve the BIOS from the nonvolatile memory as part of the boot-up sequence, wherein the CPU is further configured to execute the BIOS to determine a first target boot-up device, wherein the CPU determines that the first target boot-up device is the network device if the network interface received the wake-up data packet, and wherein the CPU determines that the first target boot-up device is a local device otherwise.

18. The computer network of claim 17, wherein the BIOS specifies a first boot order, and wherein the CPU determines a second boot order if the network interface received the wake-up data packet.

19. The computer network of claim 18, wherein the second boot order is a simple re-ordering of the first boot order such that the second boot order begins with a network device present in the first boot order.

20. The computer network of claim 18, wherein the second boot order is a truncated version of the first boot order such that the local devices are absent from the second boot order.

21. The computer network of claim 18, wherein the second boot order is specified by the wake-up data packet.

22. A computer having an improved BIOS, wherein the computer comprises:
a nonvolatile memory configured to store the improved BIOS; and
a CPU coupled to the nonvolatile memory to retrieve the BIOS after receiving a de-assertion of a reset signal, wherein the BIOS configures the CPU to determine a trigger source for the de-assertion of the reset signal, wherein the BIOS further configures the CPU to access a first target boot device to retrieve an operating system, wherein the BIOS configures the CPU to select a network boot device if the CPU determines the trigger source is reception of a wake-up data packet by the computer.

23. The computer of claim 22, wherein the BIOS further configures the CPU to select a local boot device if the CPU determines the trigger source is user operation of a local mechanism.

24. The computer of claim 23, wherein the local mechanism comprises one of a group of input devices that includes: a power switch, a reset switch, a pressable key, a pressure sensor, a mouse, a joystick, a touch pad, a microphone, and a motion sensor.

25. The computer of claim 22, wherein the computer includes a network interface coupled to a network and configured to receive the wake-up data packet, wherein the network interface is configurable to trigger the de-assertion of the reset signal in response to receiving the wake-up data packet.

* * * * *